2,845,142
LUBRICATING SYSTEM

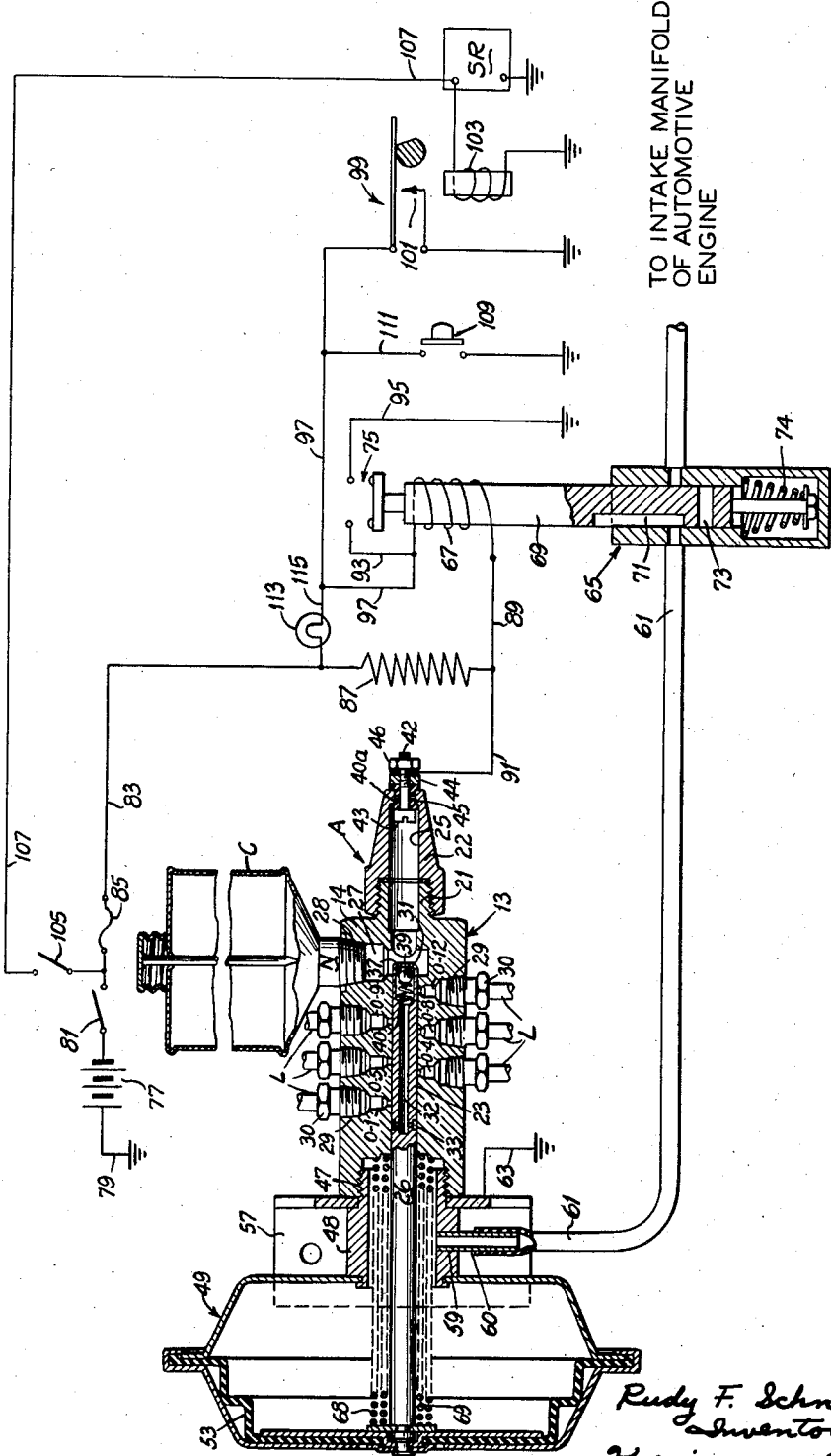

Rudy F. Schneller, O'Fallon, Mo., assignor to The McNeil Machine & Engineering Company, Akron, Ohio, a corporation of Ohio Application February 23, 1956, Serial No. 567,130

9 Claims. (Cl. 184—7)

This invention relates to lubricating systems, and more particularly to a lubricating system for automotive vehicles.

Among the several objects of the invention may be noted the provision of an improved lubricating system for an automotive vehicle which is carried by the vehicle and which is adapted automatically to provide for proper, regular and frequent (but not too frequent) lubrication of various points of lubrication of the vehicle; the provision of a system of this class which includes means whereby lubrication is effected automatically in response to a predetermined number of operations of the vehicle starter switch; the provision of a system of this class which also includes means whereby lubrication may be manually effected at will; the provision of a system of this class which includes means for signalling the completion of delivery of lubricant; the provision of a system of this class which utilizes vacuum derived from the intake manifold of the vehicle for its operation; and the provision of a system of the class described which is economical to install on a vehicle and reliable in operation. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, the single figure is a wiring diagram with certain parts of the system shown in section.

Referring to the drawing, a lubricating system of this invention is shown to include a lubricant injector A for dispensing measured charges of lubricant from a supply to individual points of lubrication of an automotive vehicle (not shown). As illustrated, this injector A is the same type as shown in U. S. Patent 2,715,454, patented August 16, 1955. In general, it comprises a cylinder designated in its entirety by the reference character 13. This cylinder 13 comprises an elongate cylinder block 14 made of suitable metal, being electrically conductive, and having an integral cylindrical extension 21 at one end constituting its forward end. Threaded on this extension 21 is a head 22. The block 14 has a central longitudinal bore 23. The head 22 has a bore 25 in extension of the bore in the block. A plunger 26 made of suitable metal is movable in the cylinder 13 toward and away from its forward end (its right end as viewed in the drawing). The plunger is dimensioned to have a sliding sealing fit in the bore 23. It is electrically conductive and is in electrically conductive relation with respect to the block 14.

The block 14 has a lateral inlet port 27 and a series of longitudinally spaced lateral outlet ports corresponding to the outlet ports O–1 to O–12 shown in U. S. Patent 2,715,454. Only the outlet ports O–1, O–5, O–9, O–4, O–8 and O–12 appear in the drawing. The inlet port 27 is located adjacent the forward end of the block leading into the bore 23, and the outlet ports are located between the other end of the block (its rearward end) and the inlet port. Reference may be made to U. S. Patent 2,715,454 for details as to the disposition of the ports with respect to the periphery of the block. The inlet port at its outer end is formed as a threaded socket 28 for receiving the screw-threaded neck N of a can C of lubricant. Each outlet port at its outer end is formed as an enlarged threaded socket 29 for receiving a compression nut 30 for connection thereto of a lubricant delivery line L leading to a point of lubrication of the vehicle in the same manner as shown in U. S. Patent 2,715,454.

The forward or working end of the plunger toward the forward or head end of the cylinder 13 is designated 31. The plunger is made hollow for some distance from its working end 31 to provide a longitudinal passage generally designated 32 for communication from the space in the cylinder 13 ahead of the plunger to a lateral port 33 in the plunger spaced from its working end. The forward end of passage 32 is formed as a valve chamber and contains a check valve seat member 37 and a valve ball 39 adapted to engage the seat 37. The ball 39 is biased toward the seat by a compression spring 40.

The lateral port 33 in the plunger is formed as an annular peripheral groove with radial openings from the passage 32 to the groove. As in U. S. Patent 2,715,454, the intervals between the outlet ports are made equal to the width of the port or groove 33, and the distance from the working end 31 of the plunger 26 to the right edge of the groove 33 is made equal to the distance from the right edge of the inlet port 27 to the left edge of the first outlet port O–1. Thus, when the plunger is moved forward from the retracted charging position shown in the drawing wherein it unblocks the inlet port 27, the groove 33 comes into communication with the first outlet port O–1 as the plunger reaches the position where it blocks off the inlet port. When the plunger is in its retracted position, lubricant may flow through the inlet port into the space in cylinder 13 ahead of the plunger to charge the injector. The groove 33 is then located to the left of the first outlet port O–1 and is blocked.

The head 22 has an opening 40a in its outer end smaller than bore 25. An electrically conductive bolt 42 is received in the opening 40a with the bolt head 43 in the bore 25 and the shank of the bolt extending out of the head 22. A nut 44 holds the bolt in place. The bolt is electrically insulated from the head 22 as indicated at 45. A second nut 46 is threaded on the shank of the bolt outward of the nut 44 for wire-clamping purposes, as will appear.

The rearward end of the cylinder 13 (its left end as viewed in the drawing) is counterbored as indicated at 47. Threaded in the counterbore 47 is a tubular fitting 48 for attachment to the cylinder 13 of a diaphragm-type vacuum motor generally designated 49. The diaphragm of this motor is indicated at 53. Details of the motor may be ascertained from U. S. Patent 2,715,454. An electrically conductive mounting bracket 57 is clamped between the fitting 48 and the rearward end of the cylinder 13 in conductive relation with respect to the cylinder 13. The fitting 48 has a lateral port 59 in which is provided a nipple 60 for connection of a vacuum line 61. The plunger 26 extends rearward out of the cylinder 13 and through the fitting 48 into the motor 49 for engagement of its rearward end by the diaphragm. A pair of coil compression springs 68 and 69 bias the plunger and the diaphragm rearward to the retracted charging position illustrated in the drawing. In the retracted position of the plunger, its forward end is so positioned that the inlet port 27 is unblocked for flow of lubricant from the can C into the space in cylinder 13 ahead of the plunger. Upon evacuation of the motor chamber on the right side of the diaphragm via port 59, atmospheric pressure on the left side of the diaphragm drives the diaphragm and the plunger to the right against the return bias of springs 68 and 69. Forward movement of the plunger is limited by engagement of its forward end 31 with the head 43 of bolt 42.

The mounting bracket 57 is attached to the vehicle at any convenient location where the bracket will be electrically grounded as indicated at 63. Lubricant delivery lines such as indicated at L lead from the outlet ports of the injector to points of lubrication of the vehicle in the manner shown in U. S. Patent 2,715,454. Means for connecting the vacuum motor 49 to the intake manifold of the vehicle is shown to comprise the line 61 and an electrically controlled valve 65, specifically a solenoid valve, in the line 61. This valve is of a type which, when deenergized, vents the vacuum motor 49 while holding vacuum in the manifold and which, when energized, connects the vacuum motor and the manifold. The coil of the solenoid valve is designated 67. As illustrated in the drawing, the valve may be of a type having a plunger 69 formed with a passage 71 for venting the vacuum motor while blocking the motor from the intake manifold when the coil is deenergized, and formed with another passage 73 for connecting the vacuum motor and the intake manifold when the coil is energized. The valve has a return spring 74 for biasing it downward as shown in the drawing to the venting position. Associated with the valve is a set of contacts 75 (insulated from the metal solenoid body). These contacts open when the coil is deenergized and the plunger is in the retracted position illustrated in the drawing, and close when the coil is energized.

At 77 is indicated the battery of the vehicle. One terminal of the battery is shown grounded as indicated at 79. The other terminal of the battery is connected to one terminal of the usual ignition switch 81 for the vehicle. A line 83, including a fuse 85, connects the other terminal of the ignition switch to one terminal of a resistor 87. Lines 89 and 91 connect the other terminal of the resistor to one terminal of the solenoid valve coil 67, and to the bolt 42 of the injector A, respectively. A line 93 connects the other terminal of coil 67 to one terminal of the set of contacts 75. The other terminal of the set of contacts 75 is grounded as indicated at 95. Contacts 75 and lines 93 and 95 constitute a holding circuit for solenoid coil 67. A line 97 connects the stated other terminal of the coil to one terminal of a counting relay 99. This relay is of a type having a set of contacts 101, a coil 103, and means (not shown) for effecting closure of the contacts 101 in response to a predetermined number of current impulses through the coil 103. Relays of this type are well-known (also being known as step-by-step or notching relays) and details thereof are omitted as not essential to this invention. It is preferred to use a relay of the type of construction shown in the copending coassigned U. S. patent application of Victor G. Klein for Electrical Relay, Serial No. 564,739 filed February 10, 1956 issued as Patent 2,813,949, November 19, 1957. The relay coil 103 is connected in series with the starter switch 105 of the vehicle in a line 107, as by connecting the coil between a terminal of the starter relay SR of the vehicle and ground, so that it receives a current impulse each time the vehicle is started. A manual push button switch 109 is connected in a line 111 between line 97 and ground in parallel with the relay contacts 101. This push button switch 109 is located on the dash of the vehicle in position for operation by the driver. A signal lamp 113 is connected in a line 115 between lines 83 and 97.

Operation is as follows:

Each time the starter switch 105 of the vehicle is closed to start the engine of the vehicle, a circuit is completed through the coil 103 of the counting relay 99 to energize the coil and operate the relay through one step. The circuit through the coil 103 is completed from the battery 77 through the ignition switch 81, the starter switch 105 and the line 107 to ground. The circuit is completed only as long as the starter switch is held closed.

Each time the relay completes a predetermined number of steps, its contacts 101 close. Upon closure of the contacts 101, a first circuit is completed for the coil 67 of the solenoid valve 65 as follows: from battery 77 through ignition switch 81, line 83 including fuse 85, resistor 87, line 89, coil 67, line 97 and contacts 101 to ground. Upon energization of the coil 67, the solenoid valve is operated (its plunger is raised from the position shown in the drawing) to connect the vacuum motor 49 to the intake manifold of the vehicle via the plunger passage 73. Energization of the coil 67 also results in closure of contacts 75 to establish a holding circuit for the coil 67 so that the coil 67 remains energized when the contacts 101 reopen. This holding circuit is as follows: from battery 77 through ignition switch 81, line 83 including fuse 85, resistor 87, line 89, coil 67, line 93, closed contacts 75 and ground connection 95. The signal lamp 113 is also energized, the circuit for this lamp being as follows: from battery 77 through ignition switch 81, line 83, line 115, line 97, line 93, closed contacts 75 and ground connection 95

Since the engine of the vehicle has been started, vacuum is established in the intake manifold of the vehicle and a vacuum is drawn in the motor 49 via the line 61. Atmospheric pressure on the motor diaphragm 53 drives the diaphragm and the injector plunger 26 forward (to the right as viewed in the drawing) through a pressure stroke against the return bias of the springs 68 and 69. Upon such forward movement of the plunger from its retracted position illustrated in the drawing, equal charges of lubricant are forced out of the cylinder successively through the outlet ports one after another and delivered to the points of lubrication of the vehicle via the delivery lines L. Further details of the operation of the injector may be ascertained from U. S. Patent 2,715,454.

The plunger 26 moves forward until its forward end engages the head 43 of the bolt 42. Upon such engagement of the plunger with the bolt, a shunt path for shunting the holding circuit for the solenoid valve coil 67 is established via line 91, bolt 42, the plunger, cylinder block 14, and the ground connection indicated at 63. The resistor 87 limits the current through the shunting path. The coil 67 of the solenoid valve is thereupon deenergized and the plunger 69 of the solenoid valve returns to the position shown in the drawing, in which it vents the vacuum motor 49 via passage 71 while holding vacuum in the intake manifold, and opens the contacts 75. The springs 68 and 69 thereupon return the injector plunger 26 to its retracted charging position, and the injector is recharged with lubricant for the next operation, lubricant flowing through the inlet port 27 into the space in the cylinder ahead of the plunger 26 to fill this space. Upon the return of the plunger 26 to its retracted position, the end 31 of the plunger 26 is disengaged from the head 43 of the bolt 42, and the stated shunting path is thereby opened. The signal lamp 113 is deenergized upon opening of contacts 75, to indicate that lubrication has been completed.

From the above, it will be understood that the injector A is automatically operated in response to a predetermined number of operations of the vehicle starter switch 105. This number is determined by the counting relay 99, and equals the number of steps of the relay between successive closures of the relay contacts 101. This number may be selected to provide for lubrication on a mileage basis, based on the driving habits of the average driver. For example, operation of the injector once for every six starts of the vehicle will provide for lubrication approximately once for each fifty miles driven, taking into consideration such factors as the average distance between stops and occasional operation of the starter switch twice to sart the engine of the vehicle. Operation of the injector may be effected at any time while the engine is running, overriding the automatic control, by momentary closure of the push button switch 109 to complete a circuit through the coil 67 as follows: from battery 77 through ignition switch 81, line 83 including fuse 85, resistor 87, line 89, coil 67, line 97 and line 111 including closed switch 109 to ground. This results in operation of the solenoid valve 65, closure of the holding circuit for the valve, energization of the lamp 113, and operation of the injector as above described. When the plunger of the injector completes its pressure stroke, the holding circuit is shunted as above described, the solenoid valve is deenergized, the plunger of the injector is retracted, and the lamp is deenergized as above described.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. In a lubricating system for an automotive vehicle, said vehicle having an engine, an intake manifold for the engine in which a vacuum is drawn when the engine is running, and a starter switch for the engine, said system being of the class comprising a lubricant injector, a vacuum-operated motor for operating the injector, and means for connecting the vacuum motor to the manifold including an electrically controlled valve which when deenergized vents the vacuum motor while holding vacuum in the manifold and which when energized connects the vacuum motor and the manifold, the improvement comprising the provision of a counting relay interconnected with said starter switch so that the relay is energized each time the starter switch is closed and interconnected with said valve to energize the valve upon a predetermined number of operations of the starter switch.

2. In a lubricating system for an automotive vehicle, said vehicle having an engine, an intake manifold for the engine in which a vacuum is drawn when the engine is running, and a starter switch for the engine, said system being of the class comprising a lubricant injector, a vacuum-operated motor for operating the injector, and means for connecting the vacuum motor to the manifold including an electrically controlled valve which when deenergized vents the vacuum motor while holding vacuum in the manifold and which when energized connects the vacuum motor and the manifold, the improvement comprising the provision of a counting relay interconnected with said starter switch so that the relay is energized each time the starter switch is closed and interconnected with said valve to energize the valve upon a predetermined number of operations of the starter switch, a holding circuit for the valve, and means responsive to completion of operation of the injector for deenergizing the holding circuit.

3. In a lubricating system for an automotive vehicle, said vehicle having an engine, an intake manifold for the engine in which a vacuum is drawn when the engine is running, and a starter switch for the engine, said system being of the class comprising a lubricant injector, a vacuum-operated motor for operating the injector, and means for connecting the vacuum motor to the manifold including an electrically controlled valve which when deenergized vents the vacuum motor while holding vacuum in the manifold and which when energized connects the vacuum motor and the manifold, the improvement comprising the provision of a counting relay interconnected with said starter switch so that the relay is energized each time the starter switch is closed and interconnected with said valve to energize the valve upon a predetermined number of operations of the starter switch, a manually operable switch shunt-connected across the relay for energizing the valve at will, a holding circuit for the valve, and means responsive to completion of operation of the injector for deenergizing the holding circuit.

4. In a lubricating system for an automotive vehicle, said vehicle having an engine, an intake manifold for the engine in which a vacuum is drawn when the engine is running, and a starter switch for the engine, said system being of the class comprising a lubricant injector, a vacuum-operated motor for operating the injector, and means for connecting the vacuum motor to the manifold including an electrically controlled valve which when deenergized vents the vacuum motor while holding vacuum in the manifold and which when energized connects the vacuum motor and the manifold, the improvement comprising the provision of a counting relay interconnected with said starter switch so that the relay is energized each time the starter switch is closed and interconnected with said valve to energize the valve upon a predetermined number of operations of the starter switch, a signal interconnected with the relay to be energized upon a predetermined number of operations of the starter switch, a holding circuit for the valve and the signal, and means responsive to completion of operation of the injector for deenergizing the holding circuit.

5. In a lubricating system for an automotive vehicle, said vehicle having an engine, an intake manifold for the engine in which a vacuum is drawn when the engine is running, and a starter switch for the engine, said system being of the class comprising a lubricant injector, a vacuum-operated motor for operating the injector, and means for connecting the vacuum motor to the manifold including an electrically controlled valve which when deenergized vents the vacuum motor while holding vacuum in the manifold and which when energized connects the vacuum motor and the manifold, the improvement comprising the provision of a counting relay interconnected with said starter switch so that the relay is energized each time the starter switch is closed and interconnected with said valve to energize the valve upon a predetermined number of operations of the starter switch, a manually operable switch connected in a circuit in parallel with the relay for energizing the valve at will, a signal interconnected with the relay and manually operable switch to be energized upon a predetermined number of operations of the starter switch or upon operation of said manually operable switch, a holding circuit for the valve and the signal, and means responsive to completion of operation of the injector for deenergizing the holding circuit.

6. In a lubricating system for an automotive vehicle, said vehicle having an engine, an intake manifold for the engine in which a vacuum is drawn when the engine is running, and a starter switch for the engine, said system being of the class comprising a lubricant injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, said cylinder being recharged through the inlet port with lubricant from the supply upon movement of the plunger through a return stroke, said cylinder being electrically conductive and electrically grounded on the vehicle, and having an electrical contact at its forward end, said contact being insulated from the cylinder, the plunger being electrically conductive and in conductive relation to the cylinder, a vacuum-operated motor for operating the injector, and means for connecting the vacuum motor to the manifold including a solenoid valve which when deenergized vents the vacuum motor while holding vacuum in the manifold and which when energized connects the vacuum motor and the manifold, the improvement comprising the provision of a counting relay having a coil interconnected with said starter switch so that the relay is energized each time the starter switch is operated and having a set of contacts connected in a first circuit with said solenoid valve adapted to close and energize the valve upon a predetermined number of operations of the starter switch, a resistor in said circuit, a holding circuit for the solenoid valve interconnected with said first circuit, said contact at the forward end of the injector cylinder being interconnected with said first circuit whereby the solenoid valve is shunted to deenergize it when the plunger engages said contact at the end of a pressure stroke.

7. In a lubricating system as set forth in claim 6, a manually operable switch connected in a circuit in parallel with the contacts of the relay for energizing the solenoid valve at will.

8. In a lubricating system for an automotive vehicle, said vehicle having an engine, an intake manifold for the engine in which a vacuum is drawn when the engine is running, and a starter switch for the engine, said system being of the class comprising a lubricant injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, said cylinder being recharged through the inlet port with lubricant from the supply upon movement of the plunger through a return stroke, said cylinder being electrically conductive and electrically grounded on the vehicle, and having an electrical contact at its forward end, said contact being insulated from the cylinder, the plunger being electrically conductive and in conductive relation to the cylinder, a vacuum-operated motor for operating the injector, and means for connecting the vacuum motor to the manifold including a solenoid valve which when deenergized vents the vacuum motor while holding vacuum in the manifold and which when energized connects the vacuum motor and the manifold, the improvement comprising the provision of a counting relay having a coil interconnected with said starter switch so that the relay is energized each time the starter switch is operated and having a set of contacts connected in a first circuit with said solenoid valve adapted to close and energize the valve upon a predetermined number of operations of the starter switch, a resistor in said circuit, a signal lamp interconnected with the relay to be energized upon a predetermined number of operations of the starter switch, a holding circuit for the solenoid valve and the signal lamp interconnected with said first circuit, said contact at the forward end of the injector cylinder being interconnected with said first circuit whereby the solenoid valve is shunted to deenergize it when the plunger engages said contact at the end of a pressure stroke.

9. In a lubricating system for an automotive vehicle, said vehicle having an engine, an intake manifold for the engine in which a vacuum is drawn when the engine is running, and a starter switch for the engine, said system being of the class comprising a lubricant injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, said cylinder being recharged through the inlet port with lubricant from the supply upon movement of the plunger through a return stroke, said cylinder being electrically conductive and electrically grounded on the vehicle, and having an electrical contact at its forward end, said contact being insulated from the cylinder, the plunger being electrically conductive and in conductive relation to the cylinder, a vacuum-operated motor for operating the injector, and means for connecting the vacuum motor to the manifold including a solenoid valve which when deenergized vents the vacuum motor while holding vacuum in the manifold and which when energized connects the vacuum motor and the manifold, the improvement comprising the provision of a counting relay having a coil interconnected with said starter switch so that the relay is energized each time the starter switch is operated and having a set of contacts connected in a first circuit with said solenoid valve adapted to close and energize the valve upon a predetermined number of operations of the starter switch, a resistor in said circuit, a manually operable switch connected in a circuit in parallel with the contacts of the relay for energizing the valve at will, a signal lamp interconnected with the relay and manually operable switch to be energized upon a predetermined number of operations of the starter switch or upon operation of the manually operable switch, a holding circuit for the solenoid valve and the signal lamp interconnected with said first circuit, said contact at the forward end of the injector cylinder being interconnected with said first circuit whereby the solenoid valve is shunted to deenergize it when the plunger engages said contact at the end of a pressure stroke.

References Cited in the file of this patent

UNITED STATES PATENTS 1,914,900   Tarbox _____ June 20, 1933